United States Patent [19]

Wang

[11] Patent Number: 5,024,490
[45] Date of Patent: Jun. 18, 1991

[54] EMERGENCY COMPRESSED-AIR BRAKE FOR AUTOMOBILES

[75] Inventor: Tingyi Wang, Qingdao, China

[73] Assignee: Beijing Stone Group Co., Beijing, China

[21] Appl. No.: 454,694

[22] Filed: Dec. 21, 1989

[30] Foreign Application Priority Data

Dec. 27, 1988 [CN] China .............................. 88216447.3

[51] Int. Cl.⁵ .............................................. B60T 15/16
[52] U.S. Cl. ...................................... 303/9; 92/130 A; 92/130 D; 188/170; 303/9.76; 303/13; 303/71; 403/299
[58] Field of Search ............... 188/170, 153 R, 153 D, 188/196 M, 196 V, 79.57, 79.58, 72.3; 303/9, 9.76, 71, 13, 25–27; 92/165, 168, 130 A, 63, 64, 130 D; 403/299, 378, 379

[56] References Cited

U.S. PATENT DOCUMENTS

| | | | |
|---|---|---|---|
| 1,418,298 | 6/1922 | Gorman | 188/196 R |
| 1,642,314 | 9/1927 | Stecke | 188/196 M |
| 1,973,624 | 9/1934 | Hanlon | 188/196 M X |
| 2,041,385 | 5/1936 | Van Laaner, Jr. | 188/196 M |
| 2,678,226 | 5/1954 | Wright | 403/299 X |
| 2,845,288 | 7/1958 | Cierpik, Jr. | 403/299 X |
| 2,854,954 | 10/1958 | Howze | 92/63 |
| 3,285,672 | 11/1966 | Avrea | 303/71 X |
| 3,713,702 | 1/1973 | Campanini | 303/13 X |
| 3,796,138 | 3/1974 | Doyle et al. | 188/170 X |
| 4,017,125 | 4/1977 | Durling | 303/9 X |
| 4,057,297 | 11/1977 | Beck et al. | 303/71 |
| 4,121,873 | 10/1978 | Durling | 303/9 X |

Primary Examiner—Douglas C. Butler
Attorney, Agent, or Firm—Ladas & Parry

[57] ABSTRACT

An emergency compressed-air brake for automobiles has the advantage to combine integrally the emergency braking, the service braking and the parking braking, which can be widely used in various road vehicles. The combined braking air-chamber involved is simple in construction. The thrust of braking includes two parts, the air pressure thrust and the spring thrust, with the resultant force of the two thrusts as a service braking thrust, with the spring thrust as a parking and emergency braking thrust. Since the spring force throughout joins in the braking, the braking gets more smoothness and is able to anti-locking.

2 Claims, 2 Drawing Sheets

EMERGENCY COMPRESSED-AIR BRAKE FOR AUTOMOBILES

The invention relates to an improvement on a compressed-air brake system for automobiles.

For the present, in an automobile employing a compressed-air brake system, the braking arm can not be driven again when there is a leak, or a fracture of pipe, or a breaking of membrane, or a failure of an engine, or a failure in the air pump to produce a lack of air supply. In such cases, the brake system results is partly or wholely ineffective. The energy-storing spring brake chamber is now widely used in the world, which combines an air inlet brake chamber and an air bleed chamber through mechnical means. When the air pressure in the pipe drops to a prescribed value or there is no air supply, the spring force in the air bleed chamber will be released and an emergency braking is put into effect. However, such a brake system during a service braking always causes the problem as to "lock up" tires due to the braking being only the virtue of an air pressure. The problem also appears generally in the compressed-air brake system for automobiles. The tires being "locked" during the braking will slip on a road-surface and bias. Moreover, this brake system with two air chambers has a complicated construction.

An object of the invention is to provide a novel emergency compressed-air employing a brake chamber of the combination type, wherein the spring throughout joins in the braking, thus the brake possesses the function of "anti-locking" during the braking. Therefore, the brake shortens a braking distance and improves the smoothness in a braking, in addition, it has an emergency braking capacity in case lack of air supply, and is simple in construction.

According to the invention, the thrust of braking includes two parts, the air-pressure thrust and the spring thrust; in braking, the resultant force of the two thrusts acts as a service braking thrust, and the spring thrust acts as a parking and emergency braking thrust. Since the spring throughout joins in the braking, and the spring will vibrate during the braking, thus the braking is smoother and is able to be "anti-locking". Further, the air chamber of the combination type according to the invention is simple in construction hence has a low cost.

Now, will describe the brake system according to the invention in the following with reference to the accompanying drawings.

Figure 1:
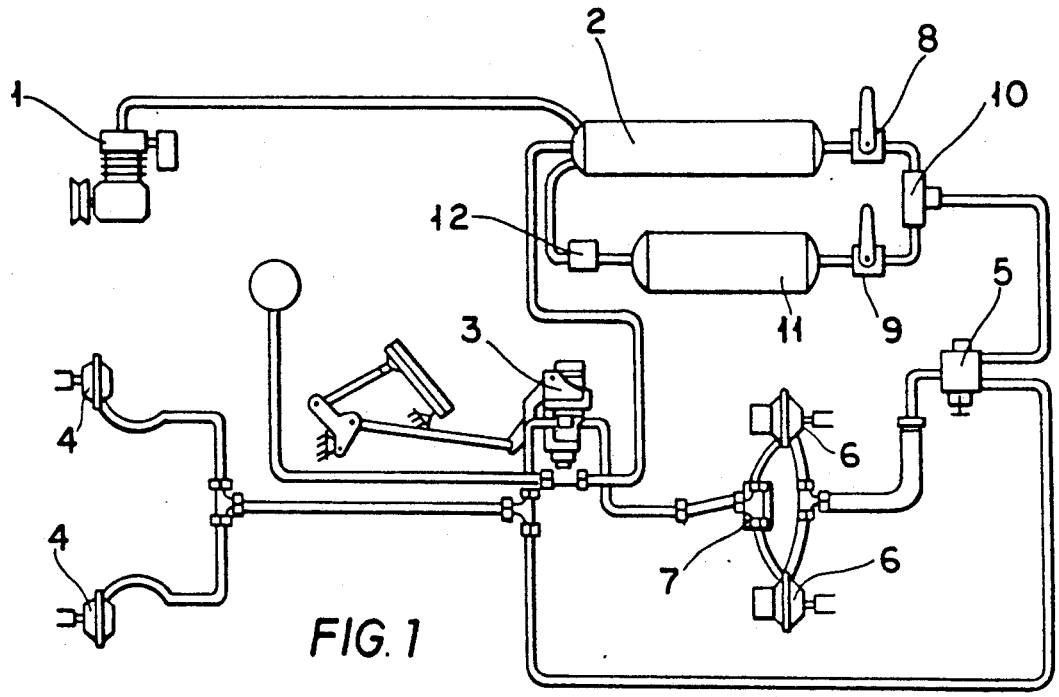
FIG. 1 is a system diagram of the brake according to the invention.

The emergency brake system according to the invention is shown as in FIG. 1 and is consisted of the following parts: an air pump 1, an air reservoir 2, a brake control valve 3, a front braking air-chamber 4, an air bleed valve 5, a combined braking air-chamber 6, a quick bleeding valve 7, a parking braking control valve 8, a brake-releasing control valve 9, a two-way valve 10, a brake-releasing air reservoir 11 and an one-way valve 12. The control valve 3 is operated by the pedal and is connected to a back cavity of the air chamber, the valve 5 and the air reservoir 2. The valve 5 is connected to the valve 10, the valve 3 and a front cavity of a chamber.

Figure 4:
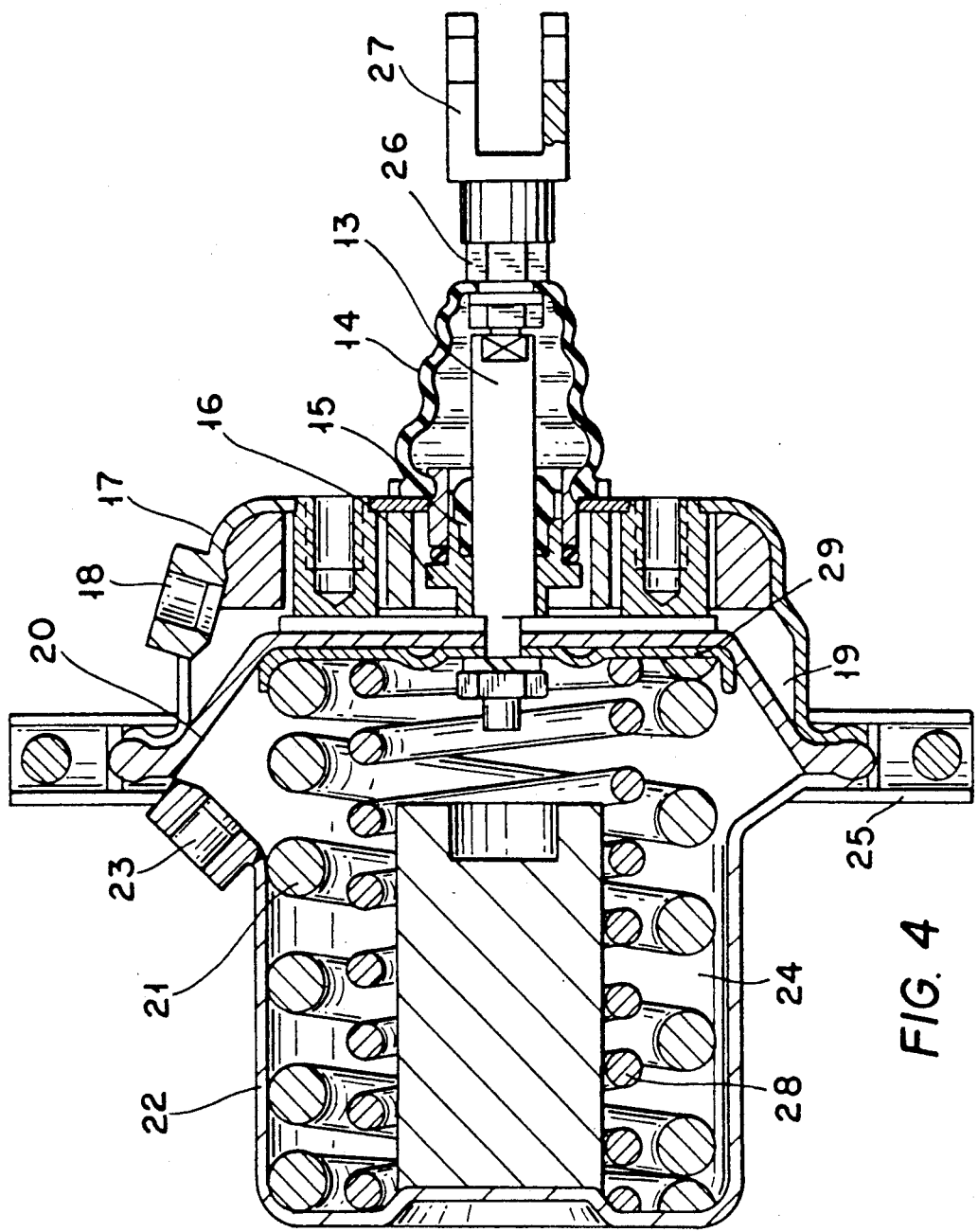
FIG. 4 is a sectional view of the braking air-chamber according to the invention.

The combined bracking air-chamber 6 shown in FIG. 4 comprises a front fork 27, an adjusting screw 26, a push bar 13, a protecting jacket 14, a sealing ring 15, a guide bushing 16, a front shell 17 of the air-chamber, an inlet 18 of the front cavity, a front cavity 19, a membrane 20, helical springs 21, 28, a back shell 22 of the air-chamber, an inlet 23 of the back cavity, a vack cavity 24, and a clamping 25. The front shell 17, back shell 22 and the membrane 20 are fast pressed by the clamping ring 25 so as to form the two separated cavities of the air-chamber. The helical springs 21 and 28 (to simplify the construction, we may use only a single spring 21) are mounted within the back shell 22, each of these springs with its one end bears against the bottom of the back shell 22 and with its other end acts on the membrane 20 through a gasket 29. The inlet 23 is provide on the back shell 22 and the inlet 18 is provided on the front shell 17. The adjusting screw 26 has the so-called two-way thread. The front fork 27 uses a left-handed screw thread and the push bar 13 uses a right-handed screw thread. The braking can be released mechanically by an adjustment of the adjusting screw 26. The sealing ring 15 is provided on the push bar 13 to protect the compressed air from leaking.

When an automobile is in its normal service, the compressed air will enter in the front cavity 19 of the braking air-chamber 6, which causes the springs 21, 28 to be compressed. When the automobile comes to be braked, the compressed air in the front cavity 19 will be bled out. In the meantime, the compressed air enters into the back cavity 24. Thus the resultant force of the air pressure and the spring force is exerted on the membrane 20, which moves the push bar 13 to effect the braking arm rotation, hence to brake the automobile.

Because the springs 21 and 28 join the braking and they vibrate during the braking (with a vibration frequency about 20-25 HZ), the vibration of the springs will be in a pulsed fashion to the membrane 20 which causes the thrust of the braking air-chamber to be changed frequently with the vibration. Thus, there produces a function of "anti-locking" to the brake drum of the wheels during the braking, which protects the tires from slipping on a road surface and shortens the braking distance to an extent of about 17%. It also prevents the automobile from slipping laterally and biasing during braking.

In the following, we will describe the brake system by four different cases with reference to FIG. I and 4.

I. In normal service, a compressed air enters through the air reservoir 2, parking braking control valve 8, two-way valve 10 and the air bleed valve 5 into the front cavity 19 of the combined braking air-chamber 6 so as to release the brake. In braking, the compressed air from the brake control valve 3 will control the air bleed valve 5 to bleed the compressed air in the front cavity 19 of the combined braking air-chamber 6. Meanwhile, the compressed air enters into the back cavity 24 of the combined braking air-chamber, and the resultant force of the air pressure and the spring force will bring the brake into effect.

II. In a parking braking, the compressed air in the front cavity 19 of the combined braking air-chamber 6 will be bled out through the parking-brake control valve 8. Meanwhile, the air supply is cut off from the air reservoir 2 and the spring force will be released to bring the brake into effect.

III. In case of a leak or fracture of the pipe or a failure of the air pump resulting in no supply of air, we may operate the brake control valve to control the air bleed valve 5 and bleed the compressed air in the front cavity 19 of the combined braking air chamber (6), then the spring force will be released and brings the brake into effect.

IV. In case the automobile is difficult to start, hence the requirement for towing, we may operate the brake-relasing control valve 9, and the compressed air will enter through the two-way valve 10 and the bleed valve 5 into the front cavity of the combined air chamber 6 to release the brake. During this time, by closing the brake-releasing control valve 9, the automobile can have a complete brake over five times.

Figure 5:
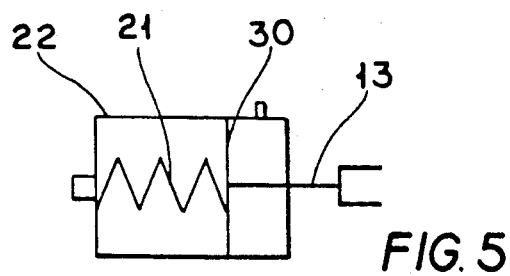
FIG. 5 shows schematically another embodiment of the braking air-chamber according to the invention.
Figure 2:
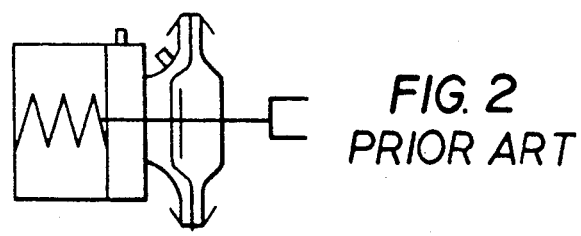
FIG. 2 is a schematic diagram of a braking air-chamber of the prior art.
Figure 3:
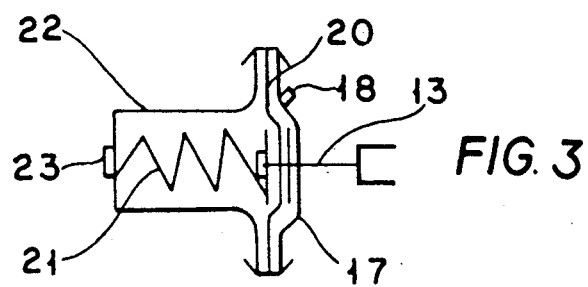
FIG. 3 is a schematical diagram of the braking air-chamber according to the invention.

FIG. 5 is a schematical view of an alternative embodiment of the braking air-chamber according to the invention, wherein a piston 30 is substituted for the membrane 20 in FIG. 4. In a braking, the air pressure cooperates with the spring force to act on the piston, driving the braking arm to brake the automobile.

In a trial, the brake according to the invention is mounted on the automobile (model CA 15). During the testing process, the membrane in the brake air-chamber is broken and each braking has 198KPa air pressure drop, which correponds to an emergency braking of four times. During the full load with a velocity 30 km/h, the braking distance will be 10.58 m, which is superior to the 22.53 m precribed in ANS ID7.1-1973. The brake force in a parking braking correspond to 38% of the complete vehicle mass of the automobile and in general, this value is prescribed over 20%.

The invention can be widely used in various road vehicles employing the compressed-air brake. The spring in the air-chamber throughout joins in the braking, the vibration of the spring causes the braking force to be changed frequently, hence an "anti-locking" function can be obtained. The smoothness in a braking has been improved and the construction involved is simple. The invention may have a variety modifications which are considered within the scope of the invention.

I claim:

1. A compressed-air brake for automobiles, which comprises a combined braking air-chamber (6) comprising a front fork (27), an adjusting screw (26), a push bar (13), a front shell (17) of the air-chamber, a front cavity (19), a diaphragm (20), at least one helical spring (21, 28), a back shell (22) of the air-chamber, a back cavity (24), said front cavity (19) and back cavity (24) being separated by said diaphragm (20), said spring (21, 28) being mounted within said back shell (22), and having one end bearing against a bottom of said back shell (22), and another end acting on said diaphragm (20) for applying a pulsed spring force during service braking to the wheels, in addition to a force produced by said compressed air.

2. A compressed-air brake for automobiles, which comprises a combined braking air-chamber (6) comprising a front fork (27), and adjusting screw (26), a push bar (13), a front shell (17) of the air-chamber, a front cavity (19), a piston (30), at least one helical spring (21, 28), a back shell (22) of the air-chamber, a back cavity (24), said front cavity (19) and back cavity (24) being separated by said piston (30), said spring (21, 28) being mounted within said back shell (22), and having one end bearing against a bottom of said back shell (22), and another end acting on said piston (30); for applying a pulsed spring force during service braking to the wheels, in addition to a force produced by said compressed air.

* * * * *